United States Patent
Yoon et al.

(10) Patent No.: US 8,005,789 B2
(45) Date of Patent: Aug. 23, 2011

(54) METHOD AND APPARATUS FOR SYNCHRONIZING MULTIMEDIA CONTENT WITH DEVICE WHICH SUPPORTS MULTI-SERVER ENVIRONMENT

(75) Inventors: Seok-hyun Yoon, Seoul (KR); Seong-hoon Kang, Suwon-si (KR); Won-ho Ryu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 11/543,944

(22) Filed: Oct. 6, 2006

(65) Prior Publication Data
US 2007/0088764 A1 Apr. 19, 2007

(30) Foreign Application Priority Data
Oct. 18, 2005 (KR) .................. 10-2005-0098161

(51) Int. Cl.
*G06F 7/00* (2006.01)
*G06F 17/00* (2006.01)
*G06F 15/16* (2006.01)

(52) U.S. Cl. .................. 707/625; 707/793; 709/203

(58) Field of Classification Search .................. 707/10, 707/200, 201, 999.1, 999.2, 999.201, 625, 707/624, 610, 609, 790–793; 709/201, 203
See application file for complete search history.

(56) References Cited

U.S. PATENT DOCUMENTS

| | | | |
|---|---|---|---|
| 2002/0078072 A1 | 6/2002 | Tan et al. | |
| 2002/0078075 A1* | 6/2002 | Colson et al. | 707/204 |
| 2003/0023619 A1 | 1/2003 | Beyda | |
| 2003/0078987 A1* | 4/2003 | Serebrennikov | 709/217 |
| 2003/0167318 A1 | 9/2003 | Robbin et al. | |
| 2004/0078370 A1* | 4/2004 | Acree et al. | 707/8 |
| 2005/0027755 A1* | 2/2005 | Shah et al. | 707/201 |

FOREIGN PATENT DOCUMENTS

| | | | |
|---|---|---|---|
| JP | 2000-082007 A | | 3/2000 |
| JP | 2005122379 A | * | 5/2005 |
| KR | 10-2002-0014888 A | | 2/2002 |
| WO | 03/032569 A1 | | 4/2003 |

OTHER PUBLICATIONS www.syncml.org, "SyncML Sync Protocol, version 1.1" Feb. 15, 2002, <http://www.openmobilealliance.org/tech/affiliates/syncml/syncml_sync_protocol_v11_20020215.pdf>, p. 1-62.*
Chvatik, Daniel, "Review: !ITunes 3.0.1" Oct. 2002, www.atpm.com <http://www.atpm.com/8.10/itunes.shtml>, p. 1-9.*
"Second Looks 1", PC User, Jan. 2005, pp. 70-73, No. 190, Japan.

* cited by examiner

*Primary Examiner* — Brent Stace
(74) *Attorney, Agent, or Firm* — Sughrue Mion, PLLC

(57) ABSTRACT

A method and apparatus for synchronizing multimedia content with a client device which supports a multi-server environment are provided. The server includes a synchronization policy management unit which acquires a synchronization policy; a synchronization information collector which collects log information of a previously performed synchronization and of a change occurring after the previously performed synchronization; a synchronization processor which performs synchronization in accordance with the collected log information; a change log management unit which stores a result of the synchronization; an interface unit which transmits the log information; and a storage unit which stores the multimedia content and the meta data of the multimedia content. The method includes acquiring a synchronization policy; collecting log information of a previous synchronization; performing synchronization with the client based on the collected log information; storing a result of the synchronization in the log information.

22 Claims, 6 Drawing Sheets

METHOD AND APPARATUS FOR SYNCHRONIZING MULTIMEDIA CONTENT WITH DEVICE WHICH SUPPORTS MULTI-SERVER ENVIRONMENT

CROSS-REFERENCE TO RELATED APPLICATION

This application claims priority from Korean Patent Application No. 10-2005-0098161 filed on Oct. 18, 2005 in the Korean Intellectual Property Office, the disclosures of which is incorporated herein by reference in its entirety.

BACKGROUND OF THE INVENTION

1. Field of the Invention

Methods and apparatuses consistent with the present invention relate to synchronization between a multimedia server and a client and, more particularly, to synchronizing multimedia content with a device which supports a multi-server environment.

2. Description of the Related Art

If a user desires to download content such as multimedia files from a server and store the downloaded content in a portable device, it is necessary to perform synchronization with the server. Particularly, as the importance of digital rights management (DRM) increases, studies for maintaining synchronization between content stored in a server and content stored in a portable device have been made. According to a related art content synchronization method, a portable device subject to synchronization, which serves as a client, is connected to the server in a one-to-one manner through an interface such as a Universal Serial Bus (USB), IEEE 1394, and others.

FIG. 1 is a view illustrating a connection between a single content synchronization server and a portable device according to a related art.

Referring to FIG. 1, the related art content synchronization server 10 and the portable device 20 are connected to each other by a wired or wireless connection and then start to synchronize with each other. The content synchronization server 10 senses the connection to the portable device 20 serving as a client to be synchronized with the server, through an interface 30 such as a USB interface or a IEEE 1394 interface. The content synchronization server 10 identifies whether the sensed portable device 20 is a synchronization target device based on additional information of the corresponding portable device 20. If it is identified that the portable device 20 is a synchronization target device, the content synchronization server 10 acquires a synchronization list of a corresponding device through a synchronization list management unit 13.

A synchronization target content collector 15 secures all data relating to synchronization by collecting a content set as a synchronization list among content stored in the content synchronization server and collecting all the content existing in a local storage of the portable device. To perform the synchronization, a synchronization processor 16 compares the content corresponding to the synchronization list of the content synchronization server 10 with all the content existing in the portable device 20, and repeatedly downloads or uploads specified content to the portable device 20 or the content synchronization server 10.

If a collision occurs in the specified content, it is processed by a given policy. In general, the existing content synchronization server adopts a policy of first reflecting content data, which exists in the content synchronization server, in the portable device. If all the content is completely processed, the synchronization ends. When the synchronization is completed, the portable device 20 is filled with the same content as the synchronization list of a corresponding portable device 20 set in the content synchronization server 10.

The related art content synchronization server 10 of FIG. 1 has several problems in synchronization.

First, the content synchronization server 10 is not suitable for a multi-server environment. According to the synchronization method of the content synchronization server 10, one or more portable devices 20 are connected to one content synchronization server 10. In other words, a specified portable device 20 which takes part in automatic synchronization with a specified content synchronization server 10 cannot simultaneously take part in automatic synchronization with another content synchronization server.

Second, the content synchronization server 10 supports only a server based unidirectional policy during the automatic synchronization. This cannot meet various demands of a user under the multi-server environment.

Third, the content synchronization server 10 performs the synchronization by comparing its content with the content of a client regardless of the change of the content. In this case, if a lot of target content exists, it is inefficient in that the synchronization becomes slow regardless of the change of the content.

Specifically, most of changes of files generated in the portable device mean the change in meta data of the content such as the frequency of playbacks and the last playback time. However, the content synchronization server 10 is inefficient in that it performs the content file based synchronization to exchange the whole files when the files are changed due to the change of their meta data, and this causes an inefficient synchronization.

In this respect, the synchronization is performed through multiple content servers, and thus it is required to provide a method and apparatus for synchronizing multimedia content with a device to match the attributes of the multimedia content.

SUMMARY OF THE INVENTION

Exemplary embodiments of the present invention overcome the above disadvantages and other disadvantages not described above. However, the present invention is not required to overcome the disadvantages described above, and an exemplary embodiment of the present invention may not overcome any of the problems described above.

The present invention provides a method and apparatus for automatically synchronizing multimedia content in a multi-server environment and for meeting various policy demands of a user as well as rapidly synchronizing mass multimedia content.

The present invention also provides a method and apparatus for rapidly synchronizing content whose change has occurred based on a change log for each synchronization policy model that can be divisionally applied to each of a content list, content meta data, and content files to meet various synchronization policy demands of a user, considering a multi-server environment.

According to an aspect of the present invention, there is provided a server which includes a synchronization policy management unit which acquires a synchronization policy for synchronization of multimedia content or meta data of the multimedia content with a client connected to the server; a synchronization information collector which collects log information of a previously performed synchronization with the client and of a change occurring after the previously performed synchronization, from the client; a synchronization processor which performs synchronization with the client in accordance with the collected log information; a change log management unit which stores a result of the synchronization with the client in the log information; an interface unit which transmits the log information so as to store the result of the synchronization in the log information of the client; and a storage unit which stores the multimedia content and the meta data of the multimedia content.

According to another aspect of the present invention, there is provided a client device which includes a synchronization server list which stores a list of servers that can perform synchronization of multimedia content; a change log management unit which stores a result of a synchronization with a server; an interface unit which transmits and receives data to and from the server; and a storage unit which stores the multimedia content or the result of the synchronization.

According to still another aspect of the present invention, there is provided a method of synchronizing multimedia content, which includes acquiring a synchronization policy for synchronization with a client connected to a server; collecting log information of a previously performed synchronization with the client; performing synchronization with the client in accordance with the collected log information; storing a result of the synchronization with the client in the log information; and storing the result of the synchronization in the log information of the client.

BRIEF DESCRIPTION OF THE DRAWINGS

The above and other aspects of the present invention will be more apparent from the following detailed description of exemplary embodiments of the present invention taken in conjunction with the accompanying drawings, in which.

DETAILED DESCRIPTION OF EXEMPLARY EMBODIMENTS OF THE PRESENT INVENTION

Figure 1:
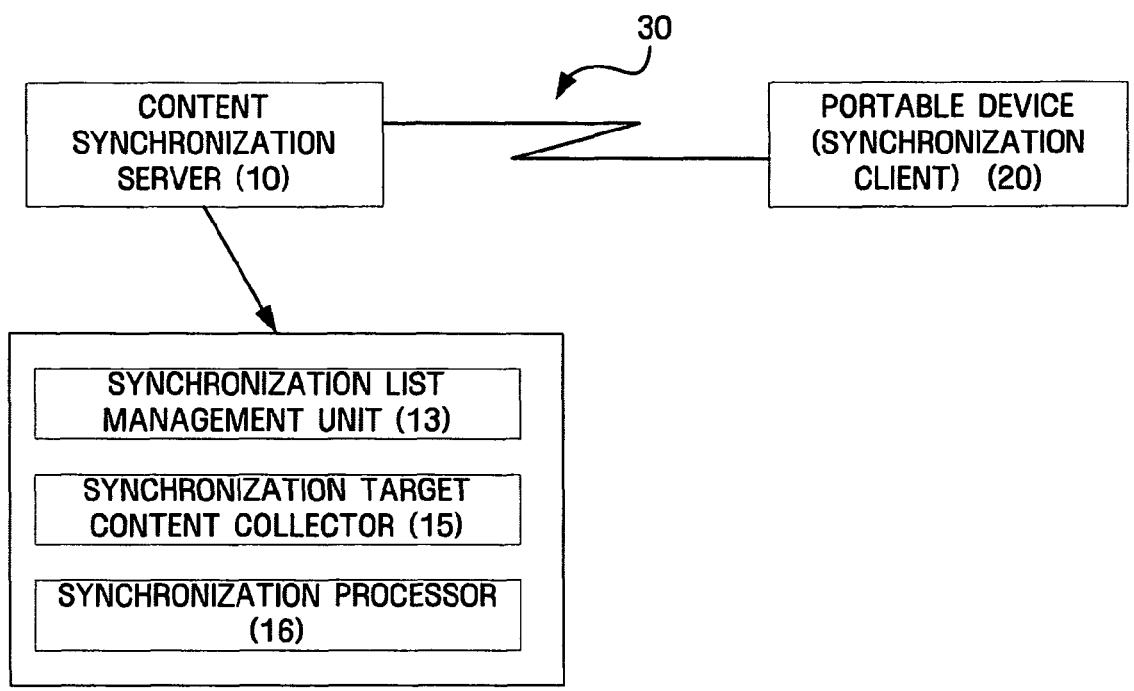
FIG. 1 is a view illustrating a connection between a content synchronization server and a portable device according to the related art.

Hereinafter, exemplary embodiments of the present invention will be described in detail with reference to the accompanying drawings. The aspects and features of the present invention and methods for achieving the aspects and features will be apparent by referring to exemplary embodiments to be described in detail with reference to the accompanying drawings. However, the present invention is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of exemplary embodiments of present invention, the same drawing reference numerals are used for the same elements across various figures.

Exemplary embodiments of the present invention will be described herein with reference to the accompanying drawings illustrating block diagrams and flowcharts for explaining a method and apparatus for synchronizing multimedia content with a device suitable for a multi-server environment as a client according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function or functions. It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 2:
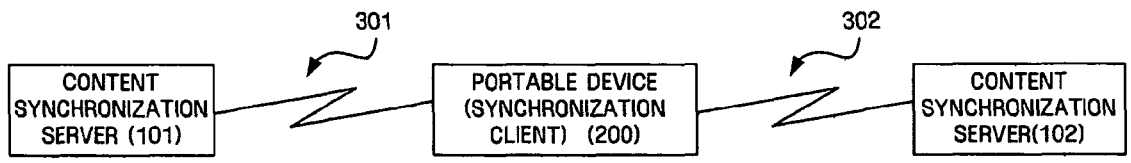
FIG. 2 is a view illustrating a connection between a portable device and a content synchronization server according to an exemplary embodiment of the present invention.

FIG. 2 is a view illustrating a connection between a portable device and a content synchronization server according to an exemplary embodiment of the present invention.

In the present invention, a portable device is used as an example of a device connected to a content synchronization server. However, this is exemplary, and a fixed device, which is not a portable device, may be connected to multiple content synchronization servers.

Referring to FIG. 2, since a portable device 200 may move freely in view of its characteristics, it may be connected to a content synchronization server 101 for performing a synchronization through an interface 301 and then another content synchronization server 102 for performing a synchronization through an interface 302 where the content synchronization server 102 is different from the content synchronization server 101. For example, in order to download music files to an MP3 player, a user may synchronize the MP3 player with a personal computer (PC) at home. Also, the user may synchronize the MP3 player with a PC at an office.

According to the related art, information relating to automatic synchronization with an existing content synchronization server 101, for example a home content server, becomes ineffective and information relating to automatic synchronization with another content synchronization server 102, for example a new office content server, becomes effective. In the present invention, a multi-server synchronization method that makes an automatic synchronization possible is used herein even though a single portable device 200 is connected to multiple content synchronization servers 101 and 102 as shown in FIG. 2.

In exemplary embodiments of the present invention, the term "unit", that is, "module" or "table", as used herein, includes, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented so as to execute one or more CPUs in a device.

Figure 3:
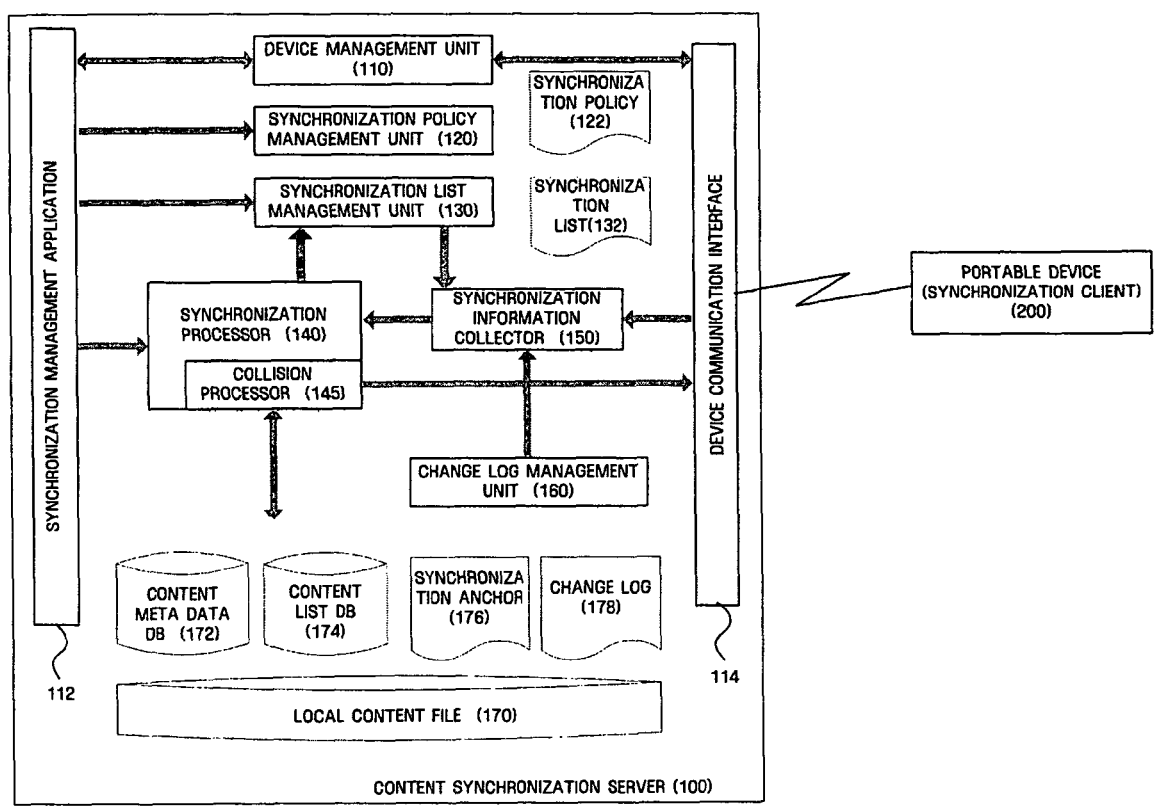
FIG. 3 is a view illustrating a content synchronization server according to an exemplary embodiment of the present invention.

FIG. 3 is a view illustrating a content synchronization server according to an exemplary embodiment of the present invention. Referring to FIG. 3, a content synchronization server 100 includes a server for storing multimedia content such as a computer, a Digital Versatile Disk (DVD), a home network server, and a Universal Plug and Play (UPNP) server. The content synchronization server 100 stores multimedia content therein. If a specified user owns a portable device such as an MP3 player in addition to multimedia content servers at home and office, the user can download multimedia files from the content server at home and the content server at office and play multimedia files in the portable device. In this case, synchronization between the content server at home and the portable device or between the content server at office and the portable device may not be performed.

For example, it is supposed that a copy function of one multimedia file is limited to five times. In this case, if the user copies the multimedia file from the content server at home to the portable device one time and then copies the multimedia file from the portable device to the content server at office one time, information of the multimedia file stored in the content server at home needs to be corrected.

To this end, the content server 101 (i.e., a content synchronization server) can synchronize with the portable device 200, and another content server 102 (i.e., another content synchronization server) can synchronize with the portable device 200. The results of synchronization are stored in the portable device 200. The portable device 200 synchronizes with the content servers again with reference to changed information.

In addition, for synchronization between multimedia files, a single portable device can synchronize with multiple content servers as shown in FIG. 2. The portable device can synchronize with another content server with reference to changed files or changed information.

FIG. 3 shows a content synchronization server according to an exemplary embodiment of the present invention.

A synchronization management application 112 interacts with a user to set various functions relating to synchronization. The synchronization management application 112 interacts with a device management unit 110 to register a synchronization target device, and controls a synchronization policy 122 through a synchronization policy management unit 120.

Furthermore, the synchronization management application 112 edits a synchronization list 132 through a synchronization list management unit 130, and serves to perform synchronization through a synchronization processor 140.

The device management unit 110 senses whether the portable device has been connected through an interface such as USB or IEEE 1394, and tests the sensed device to identify whether the device is one registered for a synchronization target. If the device is a synchronization target device but is not a registered device, the device management unit 110 can inquire the synchronization management application 112 whether to register the device.

The synchronization policy management unit 120 corrects and manages the synchronization policy 122 set for synchronization with a registered specified client portable device.

The synchronization policy 122 is a synchronization policy file set for synchronization with the registered specified client portable device. The synchronization policy 122 will be described later.

The synchronization list management unit 130 serves to store and manage a content list corresponding to the synchronization list registered in the client portable device through the synchronization management application 112.

The synchronization list 132 means a list of content set for synchronization with the specified portable device. The synchronization list 132 will be described later.

The synchronization processor 140 serves to actually perform synchronization. In other words, the synchronization processor 140 performs synchronization by acquiring synchronization information of a client and synchronization information of a synchronization server from the synchronization information collector 150. If collision occurs, a collision processor 145 processes such collision.

For example, the collision processor 145 processes a collision if content existing in the content synchronization server and the client include different data. At this time, the collision processor 145 determines whether to correct the client to adapt to the content synchronization server or correct the content synchronization server to adapt to the client, and corrects the determined target. This is called a collision process. The collision process is performed according to the synchronization policy selected by the user.

The synchronization information collector 150 collects synchronization information used by the synchronization processor 140. The synchronization information collector 150 acquires a corresponding synchronization list through the synchronization list management unit 130 to collect synchronization information of the synchronization server, and acquires a change log 178 and a synchronization anchor 176 through a change log management unit 160 to perform change log based synchronization. Also, the synchronization information collector 150 interacts with a device communication interface 114 to acquire synchronization information of the client, and acquires the change log 178 and the synchronization anchor 176 stored in the portable device through interaction with the interface 114. Also, the synchronization information collector 150 serves to acquire synchronization information from a content meta data database (DB) 172, a content list DB 174, and a local content file 170.

The change log management unit 160 serves to store and manage the change log 178 which records change occurring in the local content file 170 stored in the synchronization server, the content meta data DB 172, and the content list DB 174.

The synchronization anchor 176 determines effectiveness with previous synchronization, and stores information of a change log finally processed during previous synchronization. The synchronization anchor 176 will be described later.

The change log 178 is a file in which the change log management unit 160 records change occurring in the local content file 170, the content meta data DB 172, and the content list DB 174.

The content meta data DB 172 is a database in which meta data of the local content file 170 stored in the synchronization server is collected. The content list DB 174 is bundle information of an individual content registered in the content meta data DB 172.

The local content file 170 is a real multimedia file stored in the synchronization server, and is downloaded to the portable device or uploaded from the portable device during the synchronization process.

Figure 4:
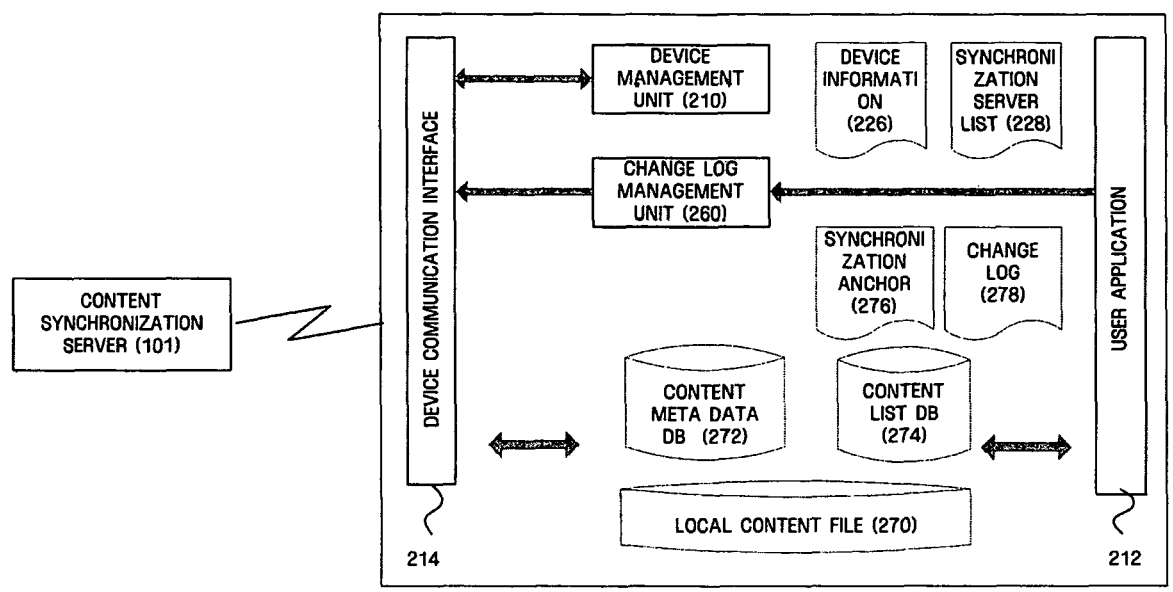
FIG. 4 is a view illustrating a portable device according to an exemplary embodiment of the present invention.

FIG. 4 is a view illustrating the portable device according to an exemplary embodiment of the present invention. A device that can store content may be the portable device, and examples of the portable device include an MP3 player, a personal media player (PMP), a digital still camera (DSC), a personal digital assistant (PDA), a camera phone, or similar device. A fixed device, which is not a portable device, may also be used to provide a function of a synchronization client as shown in FIG. 4.

A device management unit 210 serves to provide device information 226 of the portable device and a synchronization server list 228 to the synchronization server 101 through a device communication interface 214.

The device information 226 includes additional information for allowing the synchronization server to authenticate the portable device. The synchronization server list 228 stores the whole synchronization server list for synchronization with the portable device.

A change log management unit 260 serves to store and manage a change log 278 which records a change which occurs in a local content file 270, a content meta data DB 272, and/or a content list DB 274.

A synchronization anchor 276 determines effectiveness with previous synchronization, and stores information of a change log finally processed during previous synchronization.

The change log 278 is a file in which a change log management unit 260 records a change which occurs in the local content file 270, the content meta data DB 272, and/or the content list DB 274.

The content meta data DB 272 is a database in which meta data of the local content file 270 stored in the portable device is collected. The content list DB 274 is bundle information of an individual content registered in the content meta data DB 272.

The local content file 270 is a real multimedia file stored in the portable device, and is downloaded to the portable device or uploaded from the portable device during the synchronization process.

A user application 212 is one provided in the portable device.

The synchronization policy can be used during the synchronization between the content server and the portable device. The synchronization policy is a policy as to how the synchronization server and the client synchronize with each other if inconsistency between the synchronization server and the client occurs during the synchronization process. The synchronization policy is used as a reference in determining a type or direction of changing content lists and meta data of both the content synchronization server and the client, and determination of collided items. The synchronization policy follows the following policy model.

The synchronization policy is defined as the policy target for each device, and is individually used for each of content list, content file, and meta data. Synchronization direction for each policy target can be defined as follows.

A first direction is unidirectional synchronization from the synchronization server to the client, in which the client is changed based on change information of the synchronization server.

A second direction is unidirectional synchronization from the client to the synchronization server, in which the synchronization server is changed based on change information of the client.

A third direction is bidirectional synchronization between the synchronization server and the client, in which the synchronization server and the client are mutually changed based on their change information.

In addition to the synchronization target and the synchronization direction, there exists a synchronization type as an element of the synchronization policy. The synchronization type serves as a base as to what to select when collision actually occurs. Such a synchronization type can be defined as follows.

A client win type gives priority to the client when collision occurs. A server win type gives priority to the synchronization server when collision occurs. An existence merge type performs synchronization only for newly added content among changed matters of the synchronization server and the client. If the synchronization server and the client perform the existence merge, a union of targets existing in the synchronization server and in the client is produced. An up-to-date type gives priority to the latest changed matter if collision occurs.

Diverse synchronization policies are generated by combinations of the synchronization target, the synchronization direction, and the synchronization type.

The content meta data DB of the content synchronization server and the portable device will now be described.

Generally, the multimedia content file includes meta data in which information of the corresponding content is recorded, in the same manner as an MP3 file which includes ID3 meta data. Most of changes for files generated in the portable device correspond to changes in meta data of content such as the frequency of playbacks and the last play time. Since such changes in meta data are changes in meta data included in the content file, the change of files occurs, whereby the inconsistency of files is caused during the synchronization. In this case, the whole content files need to be exchanged with other ones in the prior art.

However, in exemplary embodiments of the present invention, since the content files and their content meta data DB are maintained in the content synchronization server and the client portable device, it is possible to obtain the synchronization effect by only changing the content meta data DB when the change in meta data occurs.

Although the content meta data DB can be enlarged to the extent needed for application regardless of a list of meta data, hash values used as content identifiers (IDs), such as an MD4 and MD5 of the content file, are used as a primary key of the content meta data DB to ensure the uniformity of the content individually added under the multi-server environment.

The content list DB of the content synchronization server and the portable device will now be described.

Most of multimedia content browsers use a concept called a logic bundle of content. Examples of the logic bundle of content include an album corresponding to a bundle of moving pictures and photo content files and a playback list corresponding to a bundle of music content files. It is advantageous if a content list corresponding to the logic bundle of content is commonly used among several synchronization servers under the multi-server environment. To this end, in exemplary embodiments of the present invention, there is provided a content list DB having hash values as content bundle IDs in the same manner as the content meta data DB. For example, a playback list "preference music" provided on a home content synchronization server H synchronizes with "preference music" corresponding to the content list ID of an office content synchronization server K.

The synchronization list is a series of content bundles made to designate a target for synchronization with a specified client portable device.

The synchronization list can be added or deleted in units of a content list or in units of individual content. However, the synchronization list is managed by a bundle of content lists, and individually added or deleted content is managed in the form of a basic content list.

Even though a single portable device is connected to multiple content synchronization servers, the portable device can synchronize with each server. To this end, the content synchronization server and the portable device are respectively provided with a device management unit that manages a target synchronization device, and synchronization information is stored in the unit of a device. Since the portable device can synchronize with the multiple servers, the user can additionally set new automatic synchronization while maintaining previous automatic synchronization even though the portable device such as an MP3 player is connected to a PC or a notebook computer, whereby limitations of the automatic synchronization can be overcome.

For the synchronization policy, the synchronization policy of various levels is used to perform synchronization suitable for the user's diverse demands under the multi-server synchronization environment. For example, after the synchronization direction from the home content synchronization server to the portable device is set as the synchronization policy, the automatic synchronization direction from the same portable device to the office content synchronization server is designated as the synchronization policy. In this case, the user can perform automatic synchronization by repeatedly connecting the portable device to the home content synchronization server and the office content synchronization server, whereby the home content synchronization server synchronizes with the office content synchronization server. This result can be obtained since different synchronization policies are given between the content synchronization server and the client portable device.

On the other hand, if the synchronization is performed based on the change log, only the changed content undergoes the synchronization to achieve a quick and efficient synchronization. Also, it is possible to obtain the synchronization effect by changing only the content meta data DB when the change in meta data occurs.

The content list DB can commonly be used among multiple servers. It is advantageous to commonly use the content list corresponding to the logic bundle of the content among several synchronization servers under the multi-server synchronization environment. As an example, the content list DB having hash values as content list IDs is generated in the same manner as the content meta data DB and then undergoes the synchronization, whereby the content list is commonly used among several servers.

For example, if a content list "preference music during exercise" provided in the home content server synchronizes with the portable device using the aforementioned synchronization policy and again synchronizes with the office content synchronization server, it is possible to commonly use the content list "preference music during exercise" having the same ID on the content synchronization server. As a result, it is possible to obtain diversified management effect of the content list.

Figure 5:
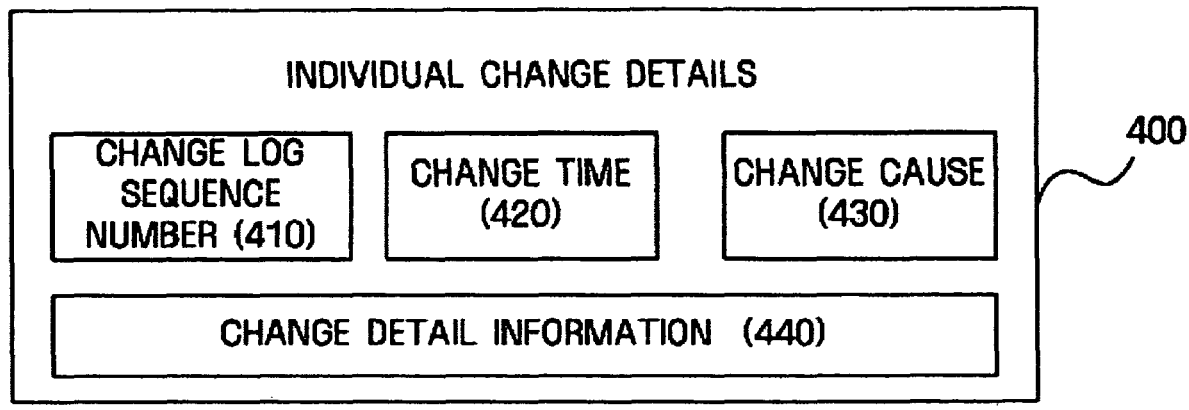
FIG. 5 is a view illustrating the configuration of a change log according to an exemplary embodiment of the present invention.

FIG. 5 is a view illustrating the configuration of the change log according to an exemplary embodiment of the present invention.

The change log 400 is comprised of records of changed matters, i.e., changed information, of the content meta data DB after the previous synchronization. The change log 400 is used to improve the efficiency of synchronization by performing the synchronization for the changed content based on information of the changed matters after the previous synchronization without retrieving the whole content to perform synchronization between the client and the content server.

A change log sequence number (CSN) 410 is a serial number given to the change log and serves as an identifier of the change log. The change log sequence number is generated in an increasing manner and processed in due order during the synchronization, whereby the processed change log can be distinguished from a change log not processed if the finally processed CSN is recorded.

A change time 420 is a time when a change to the change log occurs. Although the occurrence order of the changed matters of the corresponding device can be identified through the change log sequence number, it is advantageous to identify which one of the changed matters occurs first by collecting a change log of the content synchronization server and a change log of the client. To this end, it is advantageous to record the occurrence time of the change log.

The change log may be generated by the user's work or the result of synchronization. A change cause 430 is used to record what the occurrence cause of a corresponding change to the change log is since the change log entry generated as a result of synchronization may be disregarded during the next synchronization. Change detail information 440 is used to record details of the change actually caused.

Considering the multi-server environment in which several content synchronization servers can be connected to several portable devices, the change log of the content synchronization server is recorded for each client. Examples of a function for recording the change log for each client portable device to the content synchronization server will now be described below.

AddContentList(ContentListID) records an ID of a content list added to the synchronization list of the specified portable device while RemoveContentList(ContentListID) records an ID of a content list removed from the synchronization list of the specified portable device. AddContent(ContentListID, ContentID) records the addition of content to the synchronization list of the specified portable device. Since the synchronization list is comprised of the content list, the content list ID additionally provided with corresponding content is recorded along with the added content ID.

RemoveContent(ContentListID, ContentID) records the removal of content from the synchronization list of the specified portable device. Since the synchronization list is comprised of the content list, the content list ID from which the corresponding content is removed is recorded along with the removed content ID.

ModifyMetadata(ContentID, MetadataField) records a content ID, in which the change in meta data of content included in the synchronization list of a corresponding device occurs, and a list name of the corresponding meta data.

The change log recorded in the portable device is used by the multiple content synchronization servers under the multi-server environment. Accordingly, if a content synchronization server exists, which does not reflect a corresponding change log, a problem occurs when a change log of the content synchronization server is deleted carelessly. The portable device maintains the synchronization server list 228 as shown in FIG. 4, and determines the synchronization server list based on the whole content synchronization servers taking part in synchronization with the portable device. Particularly, to identify information of a change log processed by the specified content synchronization server, the portable device identifies a server change sequence number of an individual synchronization anchor 276. If the synchronization is stopped due to power failure and then is resumed, it is possible to identify a time when the synchronization will be performed, through the change sequence number of the anchor.

Types of the function performed in the change log recorded in the portable device will now be described below.

RegisterContent(ContentID) records a content ID of content newly registered in the content meta data DB of the portable device. In this case, the change log is generated when a resource of real content is copied. UnregisterContent(ContentID) is generated when content registered in the content meta data DB of the portable device is deleted, and records the content ID of the corresponding content. In this case, the change log is generated when a resource of real content is deleted.

ModifyMetadata(ContentID, MetadataField) is generated when the meta data of content registered in the content meta data DB of the portable device is modified, and records the content ID of corresponding content and a list name of the modified meta data.

RegisterContentList(ContentListID) is generated when a content list is newly registered in the portable device, and records the corresponding content list ID. UnregisterContentList(ContentListID) is generated when the content list registered in the portable device is deleted, and records corresponding content list ID.

AddContent(ContentListID, ContentID) is generated when content is added to the content list registered in the portable device, and is recorded along with the corresponding content list ID and the added content ID. RemoveContent(ContentListID, ContentID) is generated when the content is removed from the content list registered in the portable device, and is recorded along with the corresponding content list ID and the deleted content ID.

Figure 6:
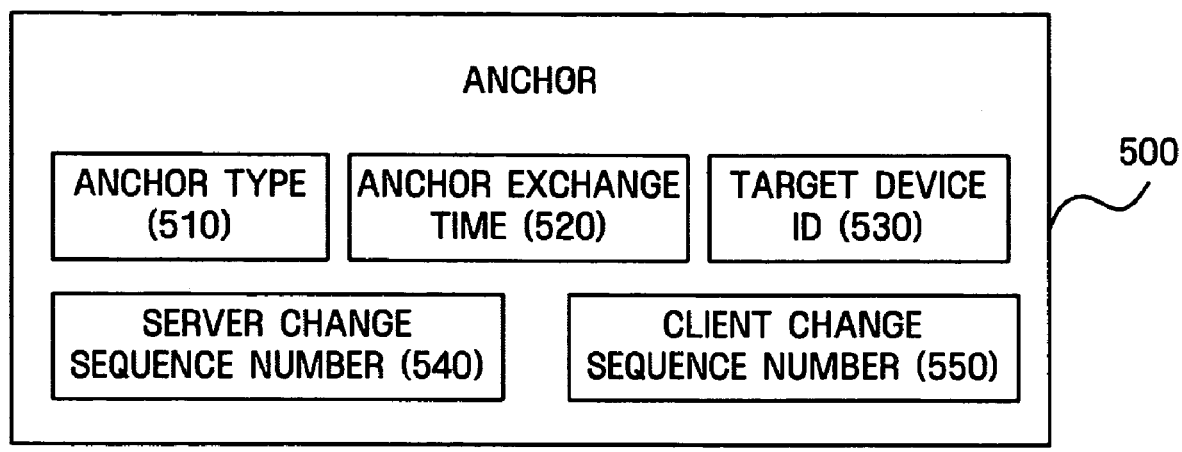
FIG. 6 is a view illustrating the configuration of a synchronization anchor according to an exemplary embodiment of the present invention.

FIG. 6 is a view illustrating the configuration of the synchronization anchor according to an exemplary embodiment of the present invention. Referring to FIG. 6, an anchor 500 is information for determining the effectiveness between the change log and the previous synchronization. The content synchronization server and the client perform the previous synchronization to identify exchanged anchor values, whereby they determine whether the synchronization based on the change log is effective. In other words, the anchor shows records of a relationship among the end time of synchronization, the synchronization work to be performed, and change records of synchronization.

The anchor is stored in both the content synchronization server and the client portable device. The content synchronization server should maintain the synchronization anchor 176 (see FIG. 3) with all the portable devices taking part in synchronization under the plural content synchronization server environment. Likewise, the client portable device should maintain the synchronization anchor 276 (see FIG. 4) with all the content synchronization servers taking part in synchronization.

The configuration of the anchor will now be described below.

First, an anchor type 510 designates a type of the anchor. The anchor type 510 is to allow the anchor to simultaneously support various types of synchronization. An anchor exchange time 520 is a record of the time when the anchor is exchanged with another one.

A target device ID 530 represents an identifier of a target server in case of the client, and represents an identifier of a target client in case of the server.

A server change sequence number 540 represents a record of a change sequence number of a change log of the server to reach the anchor exchange time. A client change sequence number 550 represents a record of a change sequence number of a change log of the client to reach the anchor exchange time. Each of the server change sequence number and the client change sequence number corresponds to a change sequence number 410 in a change log 400.

Figure 7:
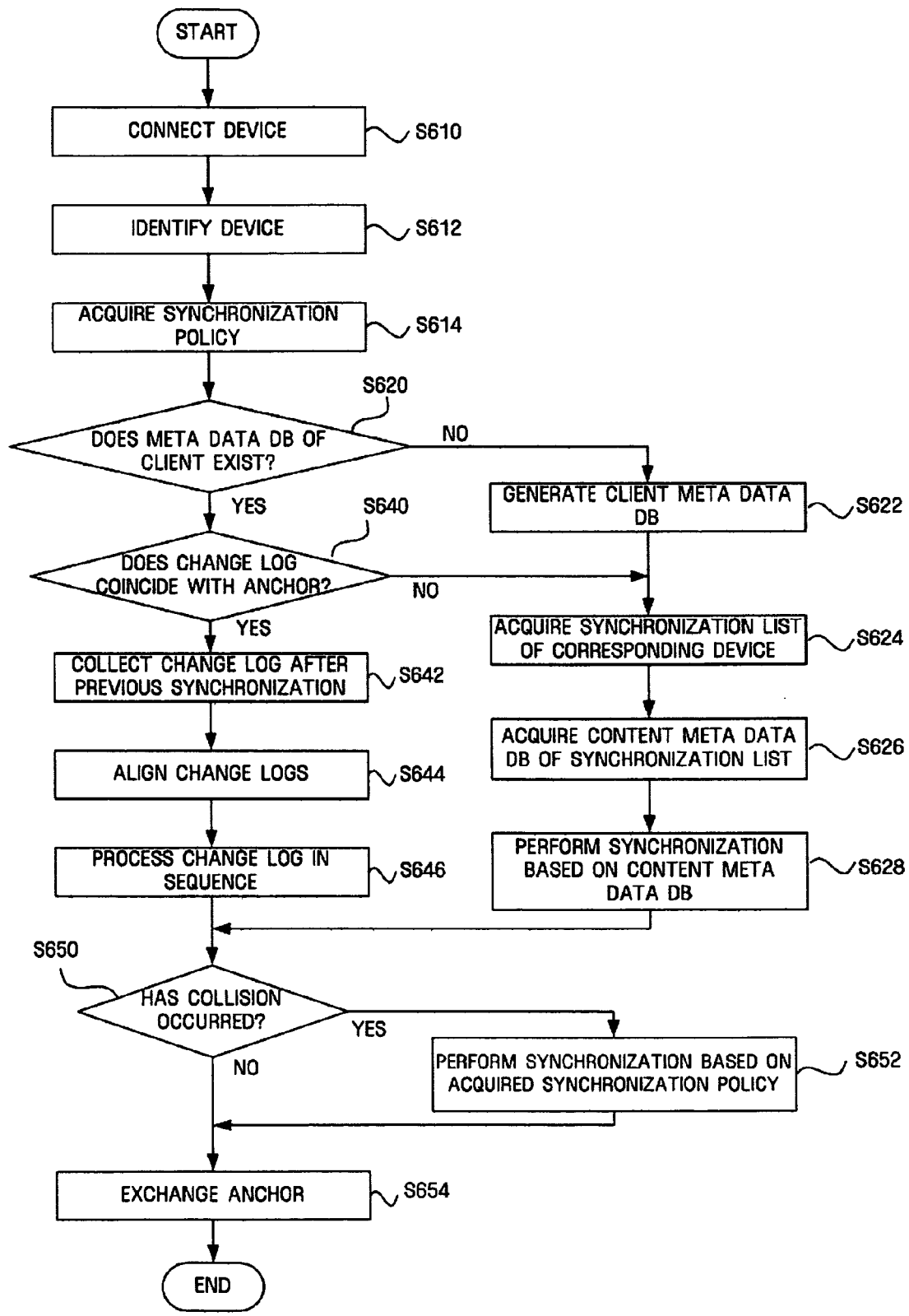
FIG. 7 is a flowchart illustrating the synchronization operation of a content synchronization server according to an exemplary embodiment of the present invention.

FIG. 7 is a flowchart illustrating a synchronization operation of the content synchronization server according to an exemplary embodiment of the present invention. First, the server is connected to the device (operation S610). The device may be a portable device such as an MP3 player or similar portable device, or a fixed device such as a personal video recorder (PVR) or similar fixed device. The portable device can be connected to the server through a communication interface such as USB. The content synchronization server monitors the device communication interface such as USB and IEEE 1394 to identify whether the synchronization target portable device is connected to the server. If the portable device is connected to the server through the device communication interface, the content synchronization server recognizes this connection and identifies what device is connected to the server (S612). To identify what device is connected to the server, the content synchronization server determines whether the target device is a synchronization target device through an authentication process. If the target device is a synchronization target device, the content synchronization server should acquire synchronization information from the portable device.

Alternatively, the content synchronization server collects device information (226 of FIG. 4) from the portable device whose connection has been sensed, to identify whether the portable device is a synchronization target device. To this end, the portable device maintains a list of every content synchronization server which synchronizes with the portable device, and at the same time should have information used by each content synchronization server. Also, the content synchronization server performs synchronization based on a synchronization list individually set to synchronize with a corresponding portable device and information collected from the portable device.

The content synchronization server acquires the synchronization policy (S614). The content synchronization server acquires the synchronization policy set in the portable device currently connected to the server among various portable devices that synchronize with the server.

The content synchronization server determines whether the meta data DB exists in the client, in order to determine the type of synchronization with the portable device (S620). If it is determined that the meta data DB of the client does not exist, the synchronization processor of the server retrieves local content files of the portable device (client) to generate a client content meta data DB on the content synchronization server (S622). The slow synchronization process is performed, which starts from operation S624. If it is determined that the meta data DB exists in the portable device (client), change log based synchronization is performed, which starts from operation S640.

The slow synchronization process is performed when the content meta data DB does not exist in the client portable device or when effectiveness with previous synchronization is not ensured during change log based synchronization.

The content synchronization server acquires the synchronization list of the corresponding device (S624). The content synchronization server which has identified connection of the synchronization target device acquires the synchronization list set in the portable device currently connected to the content synchronization server among several portable devices which synchronize with the content synchronization server.

Also, the content synchronization server acquires the content meta data DB of the synchronization list (S626). The synchronization processor of the content synchronization server extracts content recorded in the synchronization list from the content meta data DB of the whole content existing in the content synchronization server to generate the synchronization list content meta data DB.

The content synchronization server performs synchronization based on the content meta data DB (S628). Content meta data DB based synchronization is performed for the synchronization list content meta data DB and the portable device content meta data DB. The content synchronization server performs synchronization adapted to the acquired synchronization policy while retrieving both DBs separately. At this time, if collision occurs (S650), the collision processor processes collision matters based on the synchronization policy (S652).

If the synchronization process ends, the content synchronization server exchanges the anchor and synchronization end information (S654). If content meta data DB based synchronization is completely performed for all the content existing in both DBs, the content synchronization server exchanges the synchronization end information to end synchronization. The synchronization end information adds the content synchronization server to the synchronization server list of the portable device during initial synchronization, generates the anchor for current synchronization, and records the generated anchor in the synchronization anchor of the portable device and the synchronization anchor of the content synchronization server.

Meanwhile, if the meta data DB exists in the client in operation S620, change log based synchronization is performed. The change log based synchronization is performed based on change information after previous synchronization using change log recorded in the content synchronization server and change log recorded in the client portable device.

The content synchronization server identifies the change log and the anchor. To perform the change log based synchronization, it is necessary to determine effectiveness of previous synchronization and the change log. To this end, the synchronization processor of the content synchronization server acquires the synchronization anchor with the corresponding portable device recorded in the content synchronization server, and also acquires the synchronization anchor with the corresponding content synchronization server from the portable device. The synchronization processor compares the two anchor values with each other to determine whether the two anchor values are the same as each other (S640). If it is determined that the two anchor values are not the same as each other, the change log based synchronization is not performed any longer and operation S624 is performed.

If it is determined that the two anchor values are the same, the content synchronization server collects a change log after previous synchronization (S642). The anchor identified in the previous operation acquires the server change sequence number and the client change sequence number. The change log management unit acquires the change log corresponding to the corresponding portable device among the change logs stored in the content synchronization server and extracts the change log corresponding to a number greater the server change sequence number. Also, the synchronization information collector acquires the change log having a change sequence number greater than the client change sequence number among the change logs stored in the portable device.

The change logs are aligned, (S644). That is, the change logs of the content synchronization server and the client portable device are aligned in the order of the change time.

The synchronization processor of the content synchronization server processes the aligned change logs one by one in the oldest order to perform synchronization (S646). At this time, the synchronization processor tests all the change logs, which will exist later, to identify whether collision occurs (S650). If collision occurs, the collision processor processes collision based on the synchronization policy acquired in operation S614.

The content synchronization server exchanges the anchor with another one (S654). If the sequence process of all the change logs is completed, the anchor is generated to end synchronization. At this time, the anchor is generated based on the finally processed change sequence number of the change log of the content synchronization server and the change sequence number of the client portable device. The generated anchor is recorded in the synchronization anchor of the portable device and at the same time is recorded in the synchronization anchor of the content synchronization server.

As described above, in exemplary embodiments of the present invention, it is possible to perform synchronization of the device which is connected to the multiple servers. Also, if the meta data is only changed, synchronization is performed for the meta data only, whereby the synchronization time can be reduced.

Exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

What is claimed is:

1. A server comprising:
   a synchronization policy management unit which acquires a synchronization policy for synchronization of multimedia content or meta data of the multimedia content with a client connected to the server, the server listed on a synchronization server list on a client, which stores a list of servers that perform synchronization;
   a synchronization information collector which collects log information of both a previously performed synchronization of the client and a change occurring after the previously performed synchronization, from the client;

a synchronization processor which performs synchronization with the client in accordance with the log information;

a change log management unit which manages a change log which records a change occurring in the multimedia content and the meta data of the multimedia content;

an interface unit which transmits information of a result of the synchronization to the client; and a storage unit which includes a local content file storing the multimedia content and a content meta data database (DB) storing the meta data of the multimedia content, wherein if it is determined that only the meta data of the multimedia content has changed after the previously performed synchronization, the synchronization processor performs synchronization with the client for only the changed meta data, wherein the meta data of the multimedia content comprises a frequency of playbacks and a last play time of the multimedia content, wherein the content meta data DB is a database in which the meta data of the multimedia content stored in the local content file is collected, and wherein the synchronization policy is individually used for each of the multimedia content and the meta data of the multimedia content.

2. The server of claim 1, wherein the synchronization policy management unit acquires the synchronization policy by retrieving the synchronization policy using an identifier of the client.

3. The server of claim 1, wherein the synchronization policy comprises a direction policy for performing synchronization with the client.

4. The server of claim 1, wherein the synchronization policy comprises information of a device having priority for use if a collision occurs during synchronization with the client.

5. The server of claim 1, wherein anchor information stored in the client is the same as anchor information stored in the server.

6. The server of claim 1, wherein the log information comprises a change log that stores changed information generated for the multimedia content.

7. The server of claim 1, wherein the log information comprises an anchor that stores the result of the synchronization.

8. The server of claim 1, wherein
the synchronization processor compares the log information stored in the client with log information stored in the server, and
the synchronization processor performs synchronization for log information which is inconsistent between the client and the server if the log information which is inconsistent between the client and the server exists.

9. The server of claim 1, wherein the synchronization processor performs synchronization for each of the multimedia content stored in the client if the log information does not exist in the client.

10. A client device comprising:
a synchronization server list which stores a list of servers that perform synchronization of multimedia content;
a change log management unit which manages log information of both a previously performed synchronization of the multimedia content with a server of the list of servers and a change of meta data of the multimedia content occurring after the previously performed synchronization in a change log;
an interface unit which transmits data to and receives a result of a synchronization from the server; and
a storage unit which includes a local content file storing the multimedia content and a content meta data database (DB) storing the meta data of the multimedia content, wherein if it is determined that only the meta data of the multimedia content has changed after the previously performed synchronization, synchronization with the client is performed for only the changed meta data, wherein the content meta data DB is a database in which the meta data of the multimedia content stored in the local content file is collected, wherein the meta data of the multimedia content comprises a frequency of playbacks and a last play time of the multimedia content, wherein the synchronization of multimedia content is performed in accordance with a synchronization policy, and wherein the synchronization policy is individually used for each of the multimedia content and the meta data of the multimedia content.

11. The client device of claim 10, wherein the storage unit stores changed information generated for the multimedia content.

12. The client device of claim 10, wherein the storage unit comprises an anchor that stores the result of the synchronization.

13. A method of synchronizing multimedia content, the method comprising:
acquiring a synchronization policy for synchronization of multimedia content or meta data of the multimedia content with a client connected to a server, the server listed on a synchronization server list on the client, which stores a list of servers that perform synchronization;
collecting log information of both a previously performed synchronization of the client and a change occurring after the previously performed synchronization, from the client;
performing synchronization with the client in accordance with the collected log information;
storing information of a result of the synchronization with the client in the server; and
transmitting the information of the result of the synchronization to the client, and wherein the multimedia content is stored in a local content file of a storage unit and the meta data of the multimedia content is stored in a content meta data database (DB) of a storage unit, wherein if it is determined that only the meta data of the multimedia content has changed after the previously performed synchronization, the synchronization with the client is performed for only the changed meta data, wherein the meta data of the multimedia content comprises a frequency of playbacks and a last play time of the multimedia content, wherein the content meta data DB is a database in which the meta data of the multimedia content stored in the local content file is collected, and wherein the synchronization policy is individually used for each of the multimedia content and the meta data of the multimedia content.

14. The method of claim 13, wherein the acquiring the synchronization policy comprises retrieving the synchronization policy using an identifier of the client.

15. The method of claim 13, wherein the synchronization policy comprises a direction policy for performing synchronization with the client.

16. The method of claim 13, wherein the synchronization policy comprises information of a device having priority if collision occurs during the synchronization with the client.

17. The method of claim 13, wherein the log information comprises the result of the synchronization with the client.

18. The method of claim 13, wherein anchor information stored in the client is the same as anchor information stored in the server.

19. The method of claim 13, wherein the log information comprises a change log that stores changed information generated for a multimedia content.

20. The method of claim 13, wherein the log information comprises an anchor that stores the result of the synchronization.

21. The method of claim 13, wherein the performing the synchronization with the client comprises:
 comparing the log information stored in the client with log information stored in the server; and
 performing synchronization for the log information which is inconsistent between the client and the server if the log information which is inconsistent between the client and the server exists.

22. The method of claim 13, wherein if the log information of the previously performed synchronization with the client does not exist, the method further comprises performing synchronization for each multimedia content stored in the client.

* * * * *